Feb. 19, 1924.
B. J. MUMM ET AL
1,484,523
SAUSAGE CASING AND PROCESS OF PRODUCING THE SAME
Filed Jan. 25, 1923
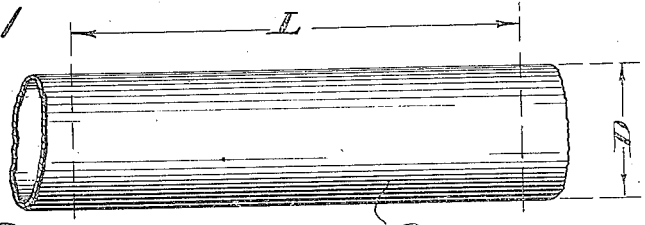
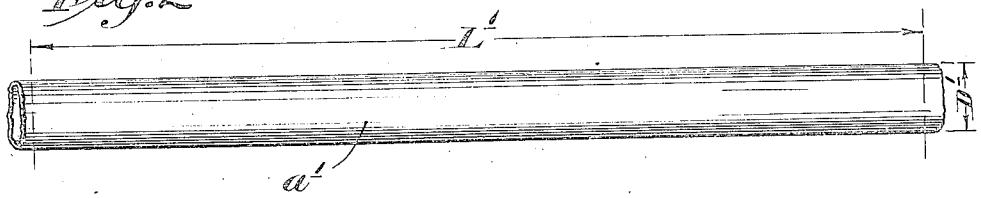
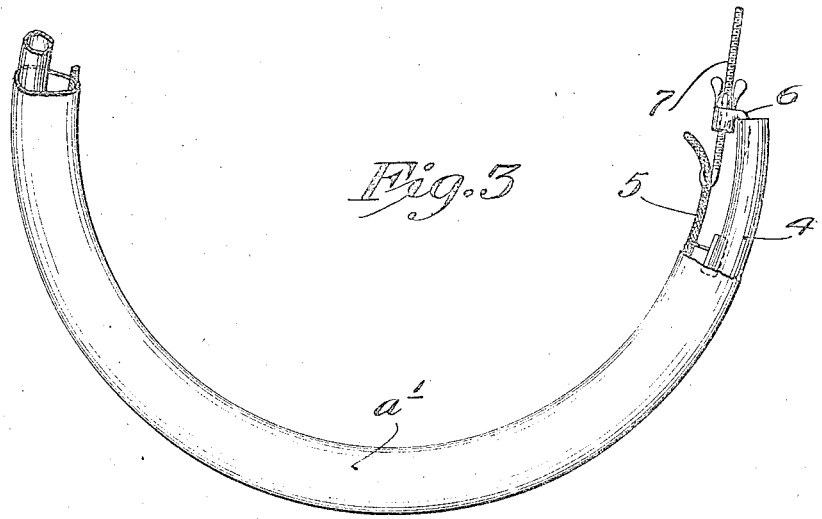
Inventors
Bernard Joseph Mumm
Bernard John Mumm
By their Attorneys Patented Feb. 19, 1924.

1,484,523

UNITED STATES PATENT OFFICE.

BERNARD JOSEPH MUMM AND BERNARD JOHN MUMM, OF ST. PAUL, MINNESOTA.

SAUSAGE CASING AND PROCESS OF PRODUCING THE SAME.

Application filed January 25, 1923. Serial No. 614,844.

*To all whom it may concern:*

Be it known that we, BERNARD JOSEPH MUMM and BERNARD JOHN MUMM, citizens of the United States, residing at St. Paul, in the county of Ramsey and State of Minnesota, have invented certain new and useful Improvements in Sausage Casings and Processes of Producing the Same; and we do hereby declare the following to be a full, clear, and exact description of the invention, such as will enable others skilled in the art to which it appertains to make and use the same.

Our present invention relates to the art of preparing or making sausage casings from animal intestines, and the invention consists both in the process and the product produced thereby or in accordance therewith.

The better grades of sausage, such as the so-called "fancy breakfast" sausage and wiener sausage, require small thin casings that are strong enough to stand the strain of filling, handling and cooking. Animal intestines are the only suitable source of sausage casings so far discovered. Sheep intestines are the only available animal intestines small enough for the fancy or small sausage and the imported sheep intestines have been found much better than the domestic sheep intestines. Moreover, sheep intestines, whether imported or domestic, are very much higher in price than the intestines of hogs and cattle. Cattle and hog intestines, however, are too large for fancy casings.

Our invention makes it possible to produce small high-grade sausage casings from relatively large intestines, and we have found that hog intestines may be utilized to the very best advantage in carrying out our invention.

It has hitherto been the common necessary practice to store, sell and ship sausage casings in wet form, contained in a salt, which necessitates the use of kegs, cans and the like. This mode of handling makes the casings heavy and their containers bulky and moreover, such wet brine-soaked casings are difficult to handle. Our invention produces casings that may be shipped and handled in dry form and which are very light in weight, so that, in a container of a given size, many times as many casings may be stored or packed as may be made possible in the wet treatment and, moreover, such dry casings may be shipped by parcel post or otherwise in the most ordinary parcels, such as paper-wrapped packages.

More specifically described, the invention is carried out substantially as illustrated in the accompanying drawings, wherein like characters indicate like parts throughout the several views.

Referring to the drawings:

Fig. 1 is a plan view showing a section of a normal relatively large intestine, such as a hog intestine;

Fig. 2 is a plan view showing the longitudinally stretched and circumferentially contracted casing; and Fig. 3 shows a section of the intestine applied on a former or forming spindle.

In Fig. 1, the original or normal intestine is indicated by the character $a$, and in Figs. 2 and 3, the casing made therefrom is indicated by the character $a^1$.

As the first step, the original intestine $a$ is treated with a solution that will take out or remove the surplus fatty substance but will leave intact the membrane necessary for the production of the sausage casing. Various known or other suitable fat-reducing substances may be used. For example, there may be used, for the above purpose, soda ash dissolved in water or lime water. This treatment makes the intestines thin, but will not reduce the tensile strength. After being thus treated, the intestine should be washed in clear water.

As the next step, the intestine, treated as just above described, is placed on a suitable former or mandrel-like structure and is very materially stretched in length, and this stretching in length decreases the circumference and diameter of the intestine. Figs. 1 and 2 serve to illustrate approximately the increased length and decreased diameter of the casing over that of the corresponding section of the original or normal intestine. For example, the longitudinal dimension L of Fig. 1 has in Fig. 2 been increased to a much longer dimension $L^1$, and the diametrical dimension D of Fig. 1 has been decreased to the diametrical dimension $D^1$ of Fig. 2.

The former illustrated in Fig. 3 is one of the several types disclosed in our companion application filed of even date herewith and entitled "Former for making sausage casings." Of course, so far as the present invention is concerned, any suitable type of former may be employed. For the purpose of this case, it is only necessary to note that the former illustrated in Fig. 3 comprises a curved tube 4 and an adjustable cord 5 anchored to the tube 4 by one or more fastening devices comprising a hook 6 and a nut-equipped rod 7. When the cord 5 is given a slack, the original intestine can be easily telescoped over the former and, moreover, the formed casing may then be readily slid off the former. The intestine in Fig. 1 and the casing in Fig. 2 are shown as straight but animal intestines are naturally curved and, for that reason, a curved former is preferably employed. When the intestine has been telescoped over the former, it will be tightly drawn and stretched, while it is wet, thereby very greatly increasing its length and decreasing its diameter and, moreover, in drawing the intestine onto the curved former, it will be frictionally held thereon so that it will not contract lengthwise but is free to contract diametrically or circumferentially. If necessary, to prevent longitudinal contraction, the ends of the intestine may be suitably clamped or held on the former.

The intestine reduced to the form of a casing and while still applied on the former, will be cured and dried. The curing may be produced by smoke from combustion, by "liquid" smoke, by alkali, acids or fumes, or by any other approved means. After the casing has been dried, it should be removed from the former and then it will be not only of the proper size, but will be very thin and sufficiently strong and will be what is recognized as an edible animal casing.

In applying the intestine on the curved former, as shown in Fig. 3, it is placed with its shortest longitudinal dimension on the concave side of the curve.

In commercial practice, we have found that very high grade, seamless, edible sausage casings of small size and of the very best class may be produced at relatively small cost, to wit: at a cost much less than that of casings made from sheep intestines. Moreover, the fact that the casings may be shipped and delivered in dry form is, from a commercial point of view, of very great importance, because it not only facilitates handling but reduces the cost of shipment.

Just before the casings are to be filled, they should be moistened with water.

What we claim is:

1. As a new article of manufacture, a seamless sausage casing in the form of an animal intestine having its particles permanently displaced by longitudinal extension and circumferential contraction, whereby the casing has greater length and less diameter than that of the original intestine from which it was made.

2. As a new article of manufacture, a seamless sausage casing in the form of an animal intestine from which fat particles have been removed and having its remaining particles displaced by longitudinal extension and circumferential contraction, whereby the casing has greater length, less diameter and thinner walls than the original intestine from which it was made.

3. As a new article of manufacture, a seamless sausage casing in the form of an animal intestine having its particles permanently displaced by longitudinal extension and circumferential contraction, whereby the casing has greater length and less diameter than that of the original intestine from which it was made, the said casing being in dry and flexible condition.

4. As a new article of manufacture, a seamless sausage casing in the form of an animal intestine from which fat particles have been removed and having its remaining particles displaced by longitudinal extension and circumferential contraction, whereby the casing has greater length, less diameter and thinner walls than the original intestine from which it was made, the said casing being in dry and flexible condition.

5. The process of producing seamless sausage casings of relatively small size from relatively large animal intestines, which consists in displacing the particles of the original intestine by longitudinal stretching and circumferential contraction, and in curing the same so as to maintain its changed dimensions, whereby the completed casing has greater length and less diameter than the original intestine from which it was made.

6. The process of producing seamless sausage casings of relatively small size from relatively large animal intestines, which consists in displacing the particles of the original intestine by longitudinal stretching and circumferential contraction while maintaining the said intestine on a curved line with the shortest longitudinal dimension of the intestine on the concave side of such curves.

7. The process of producing seamless sausage casings of relatively small size from relatively large animal intestines, which consists in displacing the particles of the original intestine by longitudinal stretching and circumferential contraction while maintaining the said intestine on a curved line with the shortest longitudinal dimension of the intestine on the concave side of such curves, and in curing the same so as to maintain its changed dimensions.

8. The process of producing seamless sausage casings, which consists in removing fatty particles from an animal intestine and in displacing the particles of the original intestine by longitudinal stretching and circumferential contraction, and in curing the same so as to maintain its changed dimensions, whereby the completed casing has greater length, less diameter and thinner walls than the original intestine.

9. The process of producing seamless sausage casings, which consists in removing fatty particles from an animal intestine and in displacing the particles of the original intestine by longitudinal stretching and circumferential contraction, in curing the same so as to maintain its changed dimensions, whereby the completed casing has greater length, less diameter and thinner walls than the original intestine, and finally drying the casing thus treated.

In testimony whereof we affix our signatures.

BERNARD JOSEPH MUMM.
BERNARD JOHN MUMM.